United States Patent [19]

Mueller et al.

[11] Patent Number: 5,127,725
[45] Date of Patent: Jul. 7, 1992

[54] METHOD AND APPARATUS FOR TESTING MULTIPLE OPTICAL FIBERS

[75] Inventors: Michael M. Mueller, Portland; Jeffrey P. Kosmoski, Tigard, both of Oreg.

[73] Assignee: Photon Kinetics, Inc., Beaverton, Oreg.

[21] Appl. No.: 587,223

[22] Filed: Sep. 24, 1990

[51] Int. Cl.⁵ .................. G01N 21/84; G01N 21/59
[52] U.S. Cl. .................... 356/73.1; 356/244
[58] Field of Search ................. 356/73.1, 244

[56] References Cited

U.S. PATENT DOCUMENTS 4,639,130  1/1987  Koike et al. .................... 356/73.1

FOREIGN PATENT DOCUMENTS 2064103  6/1981  United Kingdom ............... 356/73.1

OTHER PUBLICATIONS

Hotchkiss "Automated Loss Measurement Set for Optical Cables" Electronics Test, Jun. 1981, vol. 29 #13, pp. 32-33.

Primary Examiner—Vincent P. McGraw
Attorney, Agent, or Firm—Dellett, Smith-Hill and Bedell

[57] ABSTRACT

Apparatus for testing multiple optical fibers comprises a light source, a light detector, a first set of adapter fibers, and a second set of adapter fibers corresponding on a one-to-one basis with the first set of adapter fibers. A first end of each fiber of the first set is held in a first fiber holding structure, and a first translation mechanism is provided for translating the first fiber holding structure relative to the light source so as to bring the first end of any selected one of the first set of adapter fibers into optically coupled relationship with the light source. A first end of each fiber of the second set is held in a second fiber holding structure, and a second translation mechanism is provided for translating the second fiber holding structure relative to the detector to bring the first end of any selected one of the second set of adapter fibers into optically coupled relationship with the light detector. A controller coordinates operation of the first and second translation mechanisms so that when the first end of an adapter fiber of the first set is in optically coupled relationship with the light source, the first end of the corresponding fiber of the second set is in optically coupled relationship with the light detector.

19 Claims, 3 Drawing Sheets

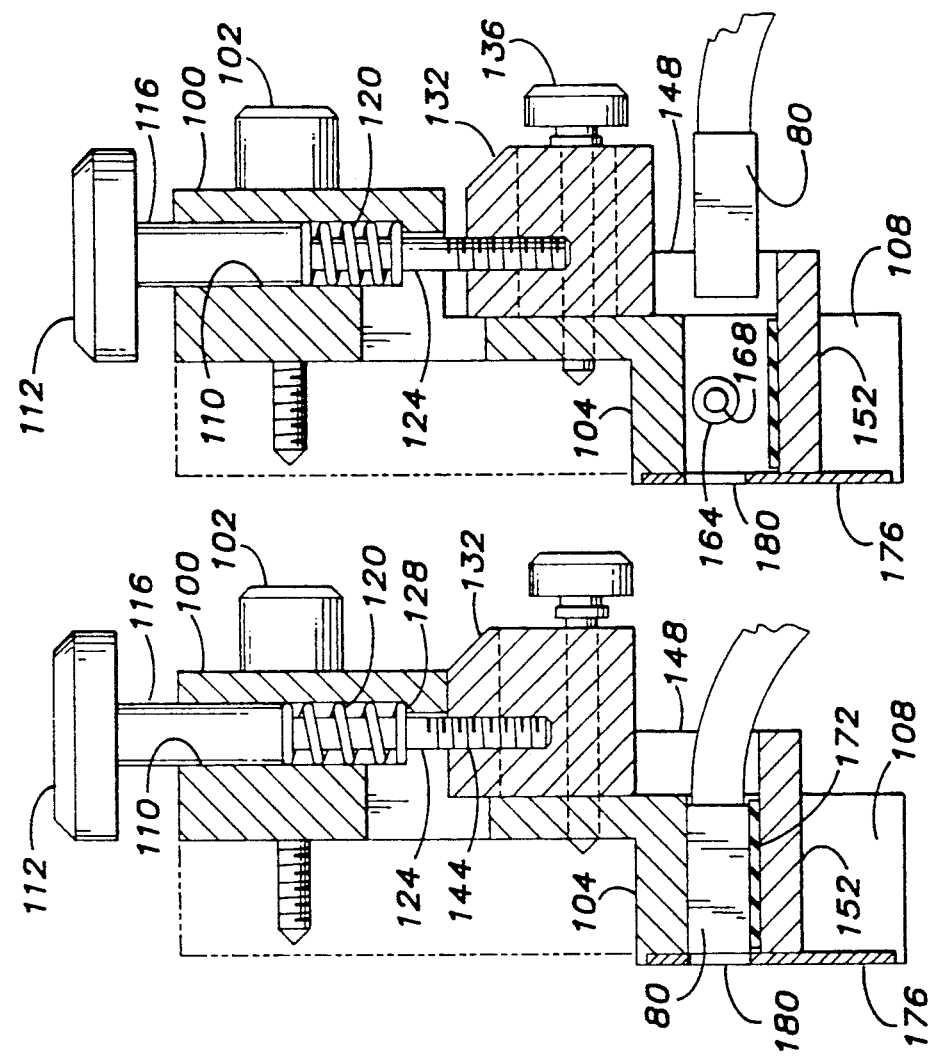
*FIG.8*
*FIG.7*
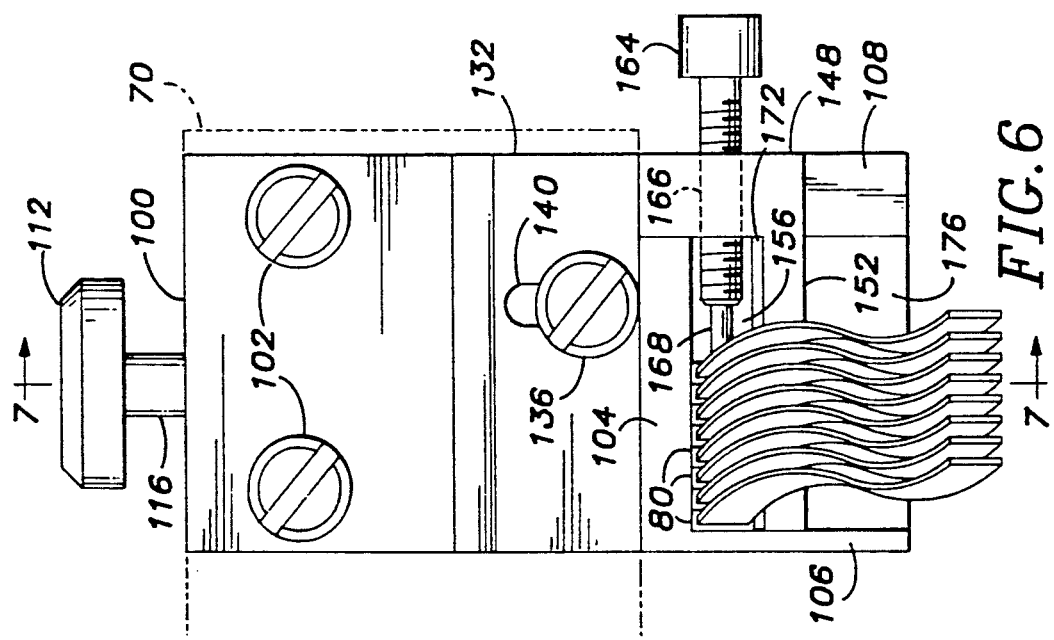
*FIG.6*

1

METHOD AND APPARATUS FOR TESTING MULTIPLE OPTICAL FIBERS

BACKGROUND OF THE INVENTION

This invention relates to a method and apparatus for testing multiple optical fibers.

An optical fiber cable may contain several hundred fibers. Before a cable is installed, it is generally necessary to test the cable. The tests that are carried out include attenuation tests. It may be necessary to test the attenuation of several fibers of the cable several times at different temperatures in order to determine the manner in which time and temperature influence the extent to which an optical signal is attenuated on passing through a fiber of the cable. Each test involves launching light into the fiber at one end of the cable and measuring the intensity with which light is emitted from the fiber at its opposite end. In an attenuation measurement instrument that is currently in use, an operator loads the two ends of a fiber to be tested into the measurement instrument and positions the ends of the fiber relative to the launch and receive optics of the instrument. When the attenuation measurement has been made, the operator unloads the fiber and loads a second fiber. This is continued until all the fibers to be tested at that particular temperature have been tested. The test may be repeated several hours later at the same temperature. The temperature is then changed, and the operation is repeated. Accordingly, attenuation testing of an optical fiber cable is time-consuming and labor intensive.

SUMMARY OF THE INVENTION

In accordance with the present invention, apparatus for testing multiple optical fibers comprises a light source, a light detector, a first set of adapter fibers, and a second set of adapter fibers corresponding on a one-to-one basis with the first set of adapter fibers. A first end of each fiber of the first set is held in a first fiber holding structure, and a first translation mechanism is provided for translating the first fiber holding structure relative to the light source so as to bring the first end of any selected one of the first set of adapter fibers into optically coupled relationship with the light source. A first end of each fiber of the second set is held in a second fiber holding structure, and a second translation mechanism is provided for translating the second fiber holding structure relative to the detector to bring the first end of any selected one of the second set of adapter fibers into optically coupled relationship with the light detector. Control means coordinate operation of the first and second translation mechanisms so that when the first end of an adapter fiber of the first set is in optically coupled relationship with the light source, the first end of the corresponding fiber of the second set is in optically coupled relationship with the light detector.

BRIEF DESCRIPTION OF THE DRAWINGS

For a better understanding of the invention, and to show how the same may be carried into effect, reference will now be made, by way of example, to the accompanying drawings in which:

FIG. 6 is an enlarged view of a component of the apparatus shown in FIG. 1, FIG. 7 is a partial vertical sectional view of the component shown in FIG. 1 when in a first condition, and FIG. 8 is a view similar to FIG. 7 showing the component in a second position.

DETAILED DESCRIPTION

Figure 1:
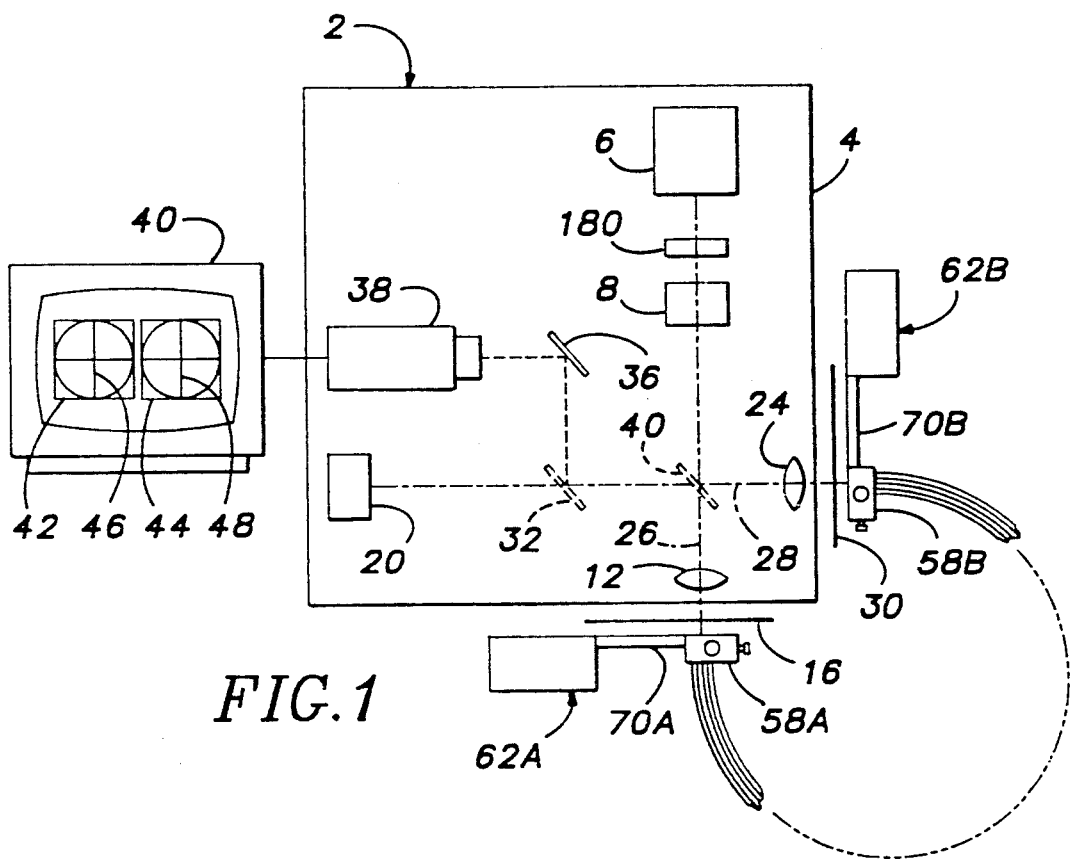
FIG. 1 is a schematic top plan view of apparatus embodying the present invention.
Figure 5:
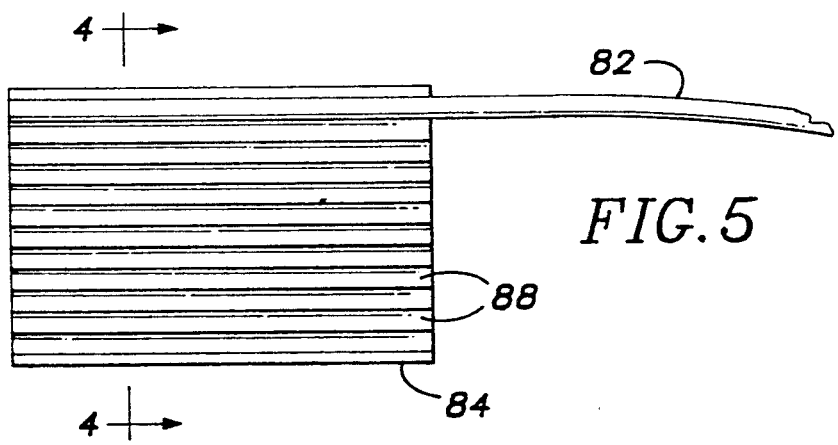
FIGS. 3, 4 and 5 illustrates various steps in preparation of the ends of a fiber optic jumper for use in the apparatus of FIG. 1.
Figure 4:
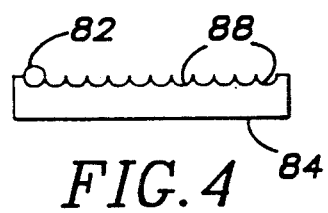
Figure 3:
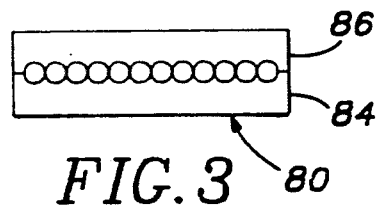

The apparatus illustrated in FIG. 1 includes an attenuation measurement instrument 2, such as the instrument sold by Photon Kinetics Inc. as its Model 2200. The attenuation measurement instrument comprises a housing 4 which is mounted on a support structure, not specifically shown, and contains a light source 6 and a monochromator 8. The monochromator transmits a light beam having a fairly narrow band of wavelengths.

The monochromator has a square entrance aperture with horizontal upper and lower edges and vertical left and right edges. Launch optics, including a lens 12, are used to image the entrance aperture of the monochromator in a plane 16 outside housing 4. The width and height of the image of the aperture may be, for example, 400 microns.

A light detector 20 and associated receive optics, including a lens 24, are mounted in housing 4. The receive optics image a plane 30 on the sensing surface of detector 20.

A beam switch 32 is operable to deflect a light beam entering housing 4 along the axis 28 of the receive optics towards a mirror 36, which reflects the beam towards a video camera 38, and a beam switch 40 is operable to deflect a light beam entering housing 4 along the axis 26 of the launch optics towards beam switch 32. The position of the imaging surface of camera 38 is optically equivalent to the position of the entrance aperture of monochromator and the sensing surface of detector 20. When beam switch 40 selects beam switch 32 and beam switch 32 selects video camera 38, planes 16 and 30 are imaged on the imaging surface of camera 38, and camera 38 provides, on a display screen 40, a view of a launch field 42 and a receive field 44, in planes 16 and 30 respectively, the fields being displayed side by side superimposed on respective pairs of cross hairs 46, 48.

The cross hairs that are displayed on the display screen are so positioned relative to the display fields that cross hairs 46 intersect at a point that is optically equivalent to a point on the axis 26 of the launch optics and the cross hairs 48 intersect at a point that is optically equivalent to a point on the axis 28 of the receive optics. The center of the monochromator aperture lies substantially on the axis of the launch optics and the center of the sensing surface of the detector lies substantially on the axis of the receive optics.

It is convenient at this point to define two three-dimensional Cartesian coordinate systems, associated with the launch and receive optics respectively. The two coordinate systems are independent, in that it is not necessary for the purpose of this description to consider movement of an object in more than one coordinate system, and therefore the three axes of each system will be referred to herein as the X, Y and Z axes. The Z axis of the launch system is horizontal and coincides with the optical axis 26 of the launch optics. Similarly, the Z axis of the receive system is horizontal and coincides with the optical axis 28 of the receive optics. The Y axis of each system is vertical, and the X axes are perpendicular to the respective Y-X planes.

Figure 2:
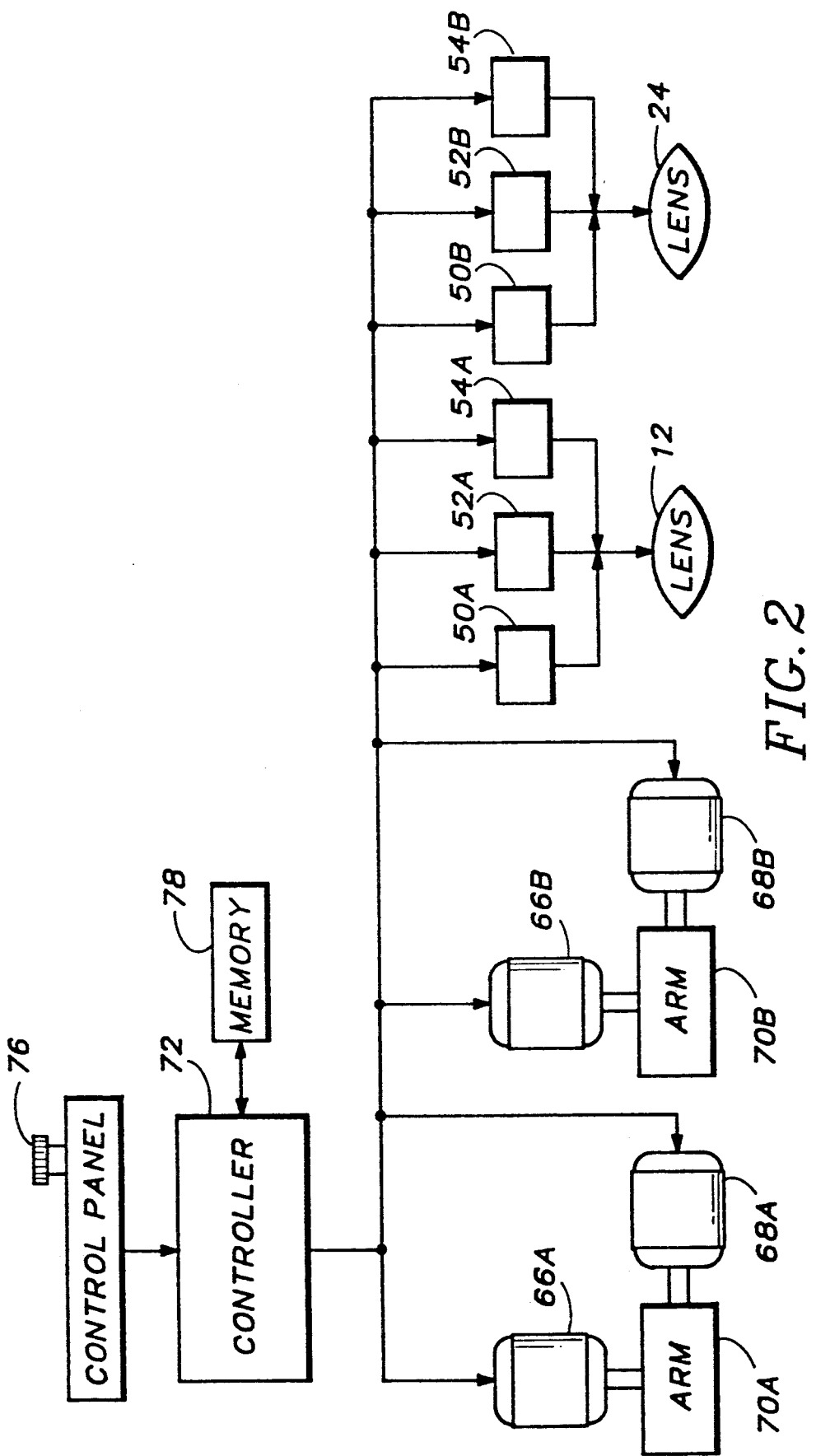
FIG. 2 is a schematic block diagram illustrating a controller that is used in conjunction with the apparatus shown in FIG. 1.

Lens 12 is movable under control of three stepper motors 50A, 52A and 54A (FIG. 2) to displace the image of the entrance aperture of the monochromator in plane 16 along the X, Y and Z directions of the launch system. Similarly, lens 24 is movable under control of three stepper motors 50B, 52B and 54B to displace the image of the detector in plane 30 along the X, Y and Z directions of the receive system.

Outside housing 4 are first and second fiber array holders 58A and 58B mounted on respective translating stages 62A and 62B. Stage 62A, also referred to herein as the launch stage, is positioned on the opposite side of plane 16 from the launch optics and is able to move holder 58A in the X and Y directions of the launch system. Stage 62B, also called the receive stage, is on the opposite side of plane 30 from the receive optics and is able to move holder 58B in the X and Y directions of the receive system.

The translating stages 62 may be of conventional form, each comprising two stepper motors 66 and 68 (FIG. 2) and a translating arm 70, to which holder 58 is attached. Stepper motor 66 controls horizontal movement of the translating arm, whereas stepper motor 68 controls vertical movement of the translating arm. The illustrated apparatus includes a controller 72 connected to the stepper motors 66 and 68 for selecting a stepper motor and applying pulses to the selected stepper motor for bringing about controlled movement of the translating arm, in increments of about 10 microns, in the direction associated with the selected stepper motor. In a manual mode of operation of the controller, the pulses are generated in response to actuation of a manual control 76, and in an automatic mode of operation the pulses are generated in response to execution of a program stored in a memory 78. Controller 72 is also connected to stepper motors 50, 52 and 54 for selecting any one of those motors and applying pulses to the selected motor to bring about controlled movement of lens 12 or 24, such as to displace the image of the monochromator aperture within or relative to plane 16 or the image of the detector within or relative to plane 30, in steps of 0.1 microns along the X, Y or Z axis of the respective system.

Thirteen fiber optic jumpers are prepared. Each jumper comprises two silicon chips 80 and a ribbon of twelve multimode optical fibers 82, with the two opposite end regions of the ribbon being embedded in the two chips respectively. Each chip 80 is formed from two silicon dies 84, 86 each having twelve parallel grooves 88. At one end of the ribbon, the twelve optical fibers are placed in the twelve grooves respectively of die 84 and the dies 84 and 86 are cemented together in confronting relationship. One end of each fiber 82 is exposed at one face of each chip, and these faces are ground so that the end faces of the fibers are all perpendicular to the axes of the grooves 88. Each end face of each fiber is therefore held in dimensionally stable fashion relative to an end face of each of eleven other fibers.

Referring to FIGS. 6-8, each holder 58 comprises a main attachment plate 100 connected by screws 102 to the translating arm 70 of stage 62. At its lower edge, plate 100 has a first jaw portion 104 having a horizontal surface, and vertical arms 106, 108 extend downwardly from jaw portion 104. A vertical bore 110 is formed in attachment plate 100, and a release button 112 has its shaft 116 fitted slidingly in bore 110. A compression spring 120 is fitted on a narrow stem portion 124 of shaft 116, between shaft 116 and a shoulder 128 of plate 100. Thus, button 112 is urged vertically upward by spring 120.

A clamp block 132 is attached to plate 100 by means of a screw 136 that extends through a slot 140 in block 132 and is in threaded engagement with plate 100. Slot 140 allow limited vertical movement of block 132 relative to plate 100. The lower end 144 of stem portion 124 is in threaded engagement with block 132. By pressing button 112, block 132 is urged downward relative to plate 100, and on releasing pressure from button 112 spring 120 forces block 132 upwards. Block 132 is connected through a vertical arm 148 to a second jaw portion 152, which cooperates with portion 102 and arms 106, 108 of plate 100 to define a clamping chamber 156. In order to open the clamping chamber, button 112 is pressed downwards, forcing jaw portion 152 away from jaw portion 102. A loading screw 164 is in threaded engagement with a hole 166 in arm 108 and contains a spring-loaded plunger 168. A pad 172 of elastomeric material is attached to the upper surface of jaw portion 152. A plate 176 attached to main attachment plate 100 defines a rectangular window 180 at the rear of the clamping chamber.

Thirteen silicon chips 80 (one for each of the thirteen jumpers) are assembled side-by-side and with their end faces substantially coplanar, for example by use of an appropriate fixture, and are loaded into the clamping chamber of holder 58A. This is accomplished by opening the clamping chamber, placing the silicon chips in the clamping chamber with their end faces engaging plate 176, closing the clamping chamber, and clamping the silicon chips in position relative to arm 160 by tightening screw 164. The chips are held in position horizontally relative to vertical arm 106. Plunger 168 limits the force that can be applied to the chips by screw 164 and thus prevents damage to the chips. Pad 172 supplies force to urge each chip upwards into contact with jaw portion 104.

The fiber ends are exposed through window 180 in thirteen vertical columns, each composed of twelve fiber ends. It will therefore be seen that each holder 58 presents an array of up to 156 fiber end faces to measurement instrument 2. Each chip in holder 58A, for example, is conveniently designated by a letter from A to M and each fiber in that chip by a number from 1 to 12. The silicon chip that is closest to the arm 106 is designated as A, the chip that is next closest to arm 106 is designated as B, and so on. The fiber whose end face is uppermost in a given chip is designated 1, the next highest is designated as 2, and so on.

The silicon chips at the opposite ends of the jumpers are assembled in similar manner and are loaded into holder 58B so as to present a second array of fiber end faces to measurement instrument 2. Care is taken to ensure that the positions of the two opposite end faces of a given fiber in the two arrays of end faces correspond, i.e. the fiber whose end face is at position J6, for example, in the launch array has its opposite end at position J6 in the receive array. This may be facilitated by color coding the fibers.

When the chips have been mounted in the holders, the fiber end faces in the array held in holder 58A lie substantially in plane 16 and the fiber end faces in the array held in holder 58B lie substantially in plane 30. Each holder and each lens is initially driven by its stepper motors to a home position, which is defined by positive mechanical stops, and the apparatus is then operated in a calibrating mode. In the calibration operation, the beam switches are set so that switch 40 selects switch 32 and beam switch 32 selects video camera 38. As previously noted, the display screen then provides a view of launch and receive fields that lie in planes 16 and 30 respectively. In response to the manual control, controller 72 applies pulses to stepper motor 66A to move arm 70A until the chip A of the launch array is visible in display field 42. If the image of the launch array is out of focus, the manual control is used to apply pulses to stepper motor 54A to adjust the position of lens 12 to bring the image into focus. Motor 68A is then selected and pulses are applied to move arm 70A so as to lower the image until the end face of fiber A1 is approximately centered on the cross hairs. The operator then selects motor 66B and operates the manual control to apply pulses to that stepper motor until chip A of the receive array is visible. If necessary, pulses are applied to stepper motor 54B to bring the image of the receive array into focus. The operator then selects motor 66B and employs the manual control to apply pulses to that motor to shift the image of the receive array down to position the receive face of fiber A1 approximately on the cross hairs. In this fashion, coarse alignment of fiber A1 is accomplished.

The operator then selects fine alignment. In fine alignment, the operator employs the manual control 76 to apply pulses to motors 50A and 52A to position the launch face of fiber A1 precisely on the launch cross hairs 46. The operator then selects motors 50B and 52B and employs the manual control to apply pulses to these motors to center the image of the receive face of fiber A1 precisely on the receive cross hairs 48. Fine alignment is thereby completed.

The number of pulses applied to each stepper motor during the coarse and fine alignment operations is stored. In this manner, a data file is developed containing the number of pulses that must be applied to each motor in order to shift the holders from their home positions to the positions in which the end faces of the A1 fiber are on the axes of the launch and receive optics respectively.

In similar manner, the manual control is used to apply pulses to the stepper motors to center the end faces of the A2 fiber precisely on the optical axes of the launch and receive optics respectively, and the number of pulses applied to each motor is stored. The resulting data file contains the number of pulses that must be applied to each motor to change from the condition in which the A1 end faces are centered on the respective cross hairs to the condition in which the A2 end faces are centered on the respective cross hairs. This operation is repeated for each of the other fibers in order to create a calibration data base.

Each jumper is then cut approximately halfway between its ends, forming a set of thirteen launch pigtails and a set of thirteen receive pigtails, each composed of twelve adapter fibers. An optical fiber cable to be tested is prepared by selecting a set of fibers to be tested and cleaving the ends of the selected fibers. Each selected fiber is spliced at one end to an adapter fiber of a launch pigtail and at its opposite end to the corresponding fiber of the corresponding receive pigtail. The adapter fibers that are used for this purpose include the A1 fibers. The cable is placed in an environmental chamber with its ends extending from the environmental chamber to a location in the vicinity of the test apparatus.

The operator defines a test sequence, which might involve bringing the cable to a first temperature and testing selected fibers in the cable periodically over an interval of several hours, then bringing the cable to a different temperature and testing those fibers periodically over a further interval of several hours. The test sequence is loaded into memory. In order to execute the test, beam switches 32 and 40 are positioned so as not to impede or deflect light passing along axes 26 and 28, and the launch and receive stages and the lenses are placed in their respective home positions. The calibration data base is used to position the appropriate adapter fibers in the optical path in the order required by the test sequence, and the detector measures the level of optical power emitted by the receive fiber. While this test is being performed on one cable, a similar test, involving the same or different temperatures and time intervals, may be carried out on selected fibers of a second cable, in a second environmental chamber.

Throughout the test, the adapter fibers remain connected to respective fibers undertest and therefore it is not necessary to load and unload the fibers into and from the measurement instrument for testing each fiber separately. When testing of a given cable has been completed, the splices between the adapter fibers and the fibers under test are broken, and the adapter fibers are cleaved and can be spliced to new fibers under test. Since each pigtail is about 5 m long, many cables can be tested before the pigtails are consumed and it is necessary to load new pigtails.

The spatial distribution of optical flux passing through the image of the monochromator aperture is not uniform, and therefore the intensity of light incident on the detector depends on the position of the launch face of the selected adapter fiber relative to the image of the monochromator aperture. The position of the optical flux distribution field relative to the image of the monochromator aperture remains substantially constant, but the position of the image of the monochromator aperture relative to axis 26 changes with time due to thermal and other stresses in the measurement instrument. Further, the optical flux distribution changes when the lamp is changed.

In order to reduce spatial variations in the intensity with which the aperture of the monochromator is illuminated, a Kohler illuminator 180 may be mounted between lamp 6 and monochromator 8. In order to eliminate effects due to changes in the position of the image of the monochromator aperture relative to axis 26, the launch face of each adapter fiber is always brought to the same position relative to the image of the monochromator aperture.

The desired position for the launch face of an adapter fiber is the position at which the rate of change of intensity with respect to position of the launch face in the X and Y directions is a minimum, so that any residual error in positioning will have the smallest possible effect. The first step in bringing the launch face of an adapter fiber to the desired position involves characterizing the optical field. This is done whenever the lamp is changed by first selecting the A1 fiber and then, in the automatic mode, centering its launch and receive faces on cross hairs 46, 48. The operator then selects an aperture calibration function. Under program control, pulses are applied to motor 50A to shift the image of the monochromator aperture in the −X direction relative to the launch face of the A1 fiber until the launch face of the A1 fiber is partially obscured from the lamp by one vertical edge of the monochromator aperture. In order to provide an objective measure of the amount by which the end face is obscured, the image is moved to the position at which the optical power detected by the detector is 3 dB below the level detected at the initial position of the image. The image is then shifted in the +X direction and the rate of change of intensity detected by the detector is measured. The number of pulses required to shift the image of the monochromator aperture from the −3 dB point to the point at which the rate of change of intensity with horizontal position is a minimum is stored as an X offset. Pulses are then applied to motor 52A to shift the image of the monochromator aperture downwards to detect the upper horizontal edge of the aperture, and the vertical position at which the optical power has fallen by 3 dB from its initial level is detected. The image is moved in the +Y direction and the rate of change of intensity with position is measured. The number of pulses required to shift the image of the monochromator aperture from the −3 dB point to the point at which the rate of change of intensity with vertical position is a minimum is stored as a Y offset.

During a test, after the launch and receive faces of a given pair of adapter fibers have been centered on the respective cross hairs, an aperture alignment operation is carried out under program control. In this operation, pulses are applied to motor 50A to move the image of the monochromator aperture in the −X direction to the position at which the detected intensity falls by 3 dB below its initial value and is then moved in the +X direction by the X offset. Similarly, the image is moved in the −Y direction to the point at which the intensity falls by 3 dB, and then in the +Y direction by the Y offset. In this fashion, each attenuation measurement is carried out with the launch face of the appropriate adapter fiber at the point at which the rate of change with position of intensity incident on the fiber is a minimum.

Precise positioning of the receive face relative to the image of the detector in plane 30 is not essential because the sensitivity of the detector is essentially uniform over its entire area. Further, the optical flux density does not vary significantly with Z over the range of possible positions of the launch and receive faces of the adapter fibers, and accordingly adjustment in the Z direction is not necessary.

It will be appreciated that the invention is not restricted to the particular embodiment that has been described, and that variations may be made therein without departing from the scope of the invention as defined in the appended claims and equivalents thereof. For example, although the invention has been described with reference to use of multimode adapter fibers, it is also applicable to use of single mode adapter fibers. If single mode adapter fibers are used, the receive optics are defocused in order to enlarge the image of the core of the adapter fiber.

We claim:

1. Apparatus for testing multiple optical fibers, comprising:
   a light source,
   a first set of adapter fibers each having first and second opposite ends,
   a second set of adapter fibers each having first and second opposite ends and corresponding on a one-to-one basis with the first set of adapter fibers,
   a first fiber holding structure in which the first ends of the first set of adapter fibers are supported,
   a first translation mechanism for translating the first fiber holding structure relative to the light source so as to bring the first end of any selected one of the first set of adapter fibers into optically coupled relationship with the light source,
   a light detector,
   a second fiber holding structure in which the first ends of the second set of adapter fibers are supported,
   a second translation mechanism for translating the second fiber holding structure relative to the detector independently of the first translation mechanism so as to bring the first end of any selected one of the second set of adapter fibers into optically coupled relationship with the light detector, and
   control means for coordinating operation of the first and second translation mechanisms so that when the first end of an adapter fiber of the first set is in optically coupled relationship with the light source, the first end of the corresponding fiber of the second set is in optically coupled relationship with the light detector.

2. Apparatus according to claim 1, comprising means defining an illumination aperture positioned between the light source and the first ends of the first set of adapter fibers, and imaging means for imaging the illumination aperture in a plane that contains the first ends of the first set of adapter fibers.

3. Apparatus according to claim 2, further comprising positioning means for shifting the imaging means so as to bring the first end of any selected one of the first set of adapter fibers and the image of the illumination aperture into predetermined relative positions.

4. Apparatus according to claim 3, comprising means for automatically offsetting the image of the illumination aperture relative to the first end of a selected fiber of the first set by a predetermined amount.

5. Apparatus according to claim 1, wherein the light detector has a sensing surface, and the apparatus further comprises imaging means for imaging the sensing surface in a plane that contains the first ends of the second set of adapter fibers.

6. Apparatus according to claim 5, comprising means for shifting the imaging means to bring the image of the sensing surface and any selected one of the second set of adapter fibers to predetermined relative positions.

7. Apparatus according to claim 1, comprising launch optics for directing light from the light source along a first axis and receive optics for directing light towards the light detector along a second axis, the first and second axes being substantially perpendicular to each other, and wherein the first translation mechanism translates the first fiber holding structure so as to bring the first end of any selected one of the first set of adapter fibers into alignment with the first axis and the second translation mechanism translates the second fiber holding structure so as to bring the first end of any selected one of the second set of adapter fibers into alignment with the second axis.

8. Apparatus according to claim 3, wherein the first translation mechanism is operative in response to the control means to bring the first end of any selected one of the first set of fibers to a predetermined position in said plane, and the positioning means are operative in response to the control means to shift the imaging means to a position such that a location at which the image of the illumination aperture has maximum intensity coincides with said predetermined position.

9. Apparatus according to claim 8, wherein the control means are operative in conjunction with the light detector for determining the location at which the image of the illumination aperture is of maximum intensity, and subsequently controlling the position means so as to shift the imaging means to bring said location into coincidence with the first end of any selected one of the first set of adapter fibers.

10. A device for receiving and supporting multiple objects each having the shape of a rectangular prism, comprising a base member having a first jaw portion and an arm extending substantially perpendicular to the first jaw portion, a clamping block attached to the base member and movable with respect thereto in a direction perpendicular to said first jaw portion, said clamping block having a second jaw portion extending substantially parallel to said first jaw portion and in confronting relationship therewith, means for urging the second jaw portion toward the first jaw portion, and means for urging an object that is between the first and second jaw portions against said arm of the base plate.

11. A device according to claim 10, wherein the base plate has a second arm extending parallel to the first-mentioned arm and spaced apart therefrom along the first jaw portion, and said means for urging an object against the first-mentioned arm comprise a screw member in threaded engagement with a hole in the second arm.

12. A device according to claim 11, wherein the screw member includes a spring-loaded plunger.

13. A device according to claim 10, wherein the means for urging the second jaw portion toward the first jaw portion comprise a spring.

14. A device according to claim 10, comprising an actuator member for urging the second jaw portion away from the first jaw portion to allow insertion of objects between the first and second jaw portions.

15. A device according to claim 14, wherein the actuating member comprises a plunger, and the means for urging the second jaw portion toward the first jaw portion comprise a spring fitted on the plunger.

16. Apparatus for testing multiple optical fibers, comprising:

a light source;

a first set of adapter fibers each having first and second opposite ends, a second set of adapter fibers each having first and second opposite ends and corresponding on a one-to-one basis with the first set of adapter fibers, a first fiber holding structure in which the first ends of the first set of adapter fibers are supported, means defining an illumination aperture positioned between the light source and the first ends of the first set of adapter fibers, imaging means for imaging the illumination aperture in a plane that contains the first ends of the first set of adapter fibers, a first translation mechanism for translating the first fiber holding structure relative to the light source so as to bring the first end of any selected one of the first set of adapter fibers into optically coupled relationship with the light source, positioning means for shifting the imaging means so as to bring the first end of the selected one of the first set of adapter fibers and the image of the illumination aperture into predetermined relative positions, a light detector, a second fiber holding structure in which the first ends of the second set of adapter fibers are supported, a second translation mechanism for translating the second fiber holding structure relative to the detector to bring the first end of any selected one of the second set of adapter fibers into optically coupled relationship with the light detector, and control means for coordinating operation of the first and second translation mechanisms so that when the first end of an adapter fiber of the first set is in optically coupled relationship with the light source, the first end of the corresponding fiber of the second set is in optically coupled relationship with the light detector.

17. Apparatus according to claim 16, wherein first translation mechanism is operative in response to the control means to bring the first end of any selected one of the first set of fibers to a predetermined position in said plane, and the positioning means are operative in response to the control means to shift the imaging means to a position such that a location at which the image of the illumination aperture has maximum intensity coincides with said predetermined position.

18. Apparatus according to claim 17, wherein the control means are operative in conjunction with the light detector for determining the location at which the image of the illumination aperture is of maximum intensity, and subsequently controlling the positioning means so as to shift the imaging means to bring said location into coincidence with the first end of the selected one of the first set of adapter fibers.

19. Apparatus according to claim 18, wherein the control means are responsive to the light detector and are operative when the first end of a first fiber of the first set of adapter fibers is at said predetermined position to cause the positioning means to shift the imaging means to a position at which the intensity of light received by the light detector is a maximum, and are subsequently operative when the first end of a second fiber of the first set of adapter fibers is at said predetermined position to cause the positioning means to shift the imaging means to the same position.

* * * * *

UNITED STATES PATENT AND TRADEMARK OFFICE
CERTIFICATE OF CORRECTION

PATENT NO. : 5,127,725

DATED : July 7, 1992

INVENTOR(S) : Michael M. Mueller; Jeffrey P. Kosmoski

It is certified that error appears in the above-identified patent and that said Letters Patent is hereby corrected as shown below:

Column 6, line 23, "undertest" should read --under test--.

Column 9, line 11, "position means" should read --positioning means--.

Signed and Sealed this

Seventh Day of September, 1993

Attest:

BRUCE LEHMAN

*Attesting Officer*    *Commissioner of Patents and Trademarks*